US011331564B1

(12) United States Patent
Baker et al.

(10) Patent No.: US 11,331,564 B1
(45) Date of Patent: *May 17, 2022

(54) CONSCIOUSNESS RAISING TECHNOLOGY (71) Applicant: Conscious Dimensions, LLC, Cincinnati, OH (US)

(72) Inventors: Myra Baker, Xenia, OH (US); Robin Grant, Cincinnati, OH (US); Dorothy Hatic, Milford, OH (US); Deborah Ooten, Cincinnati, OH (US); Mary Barr Rhodes, Wyoming, OH (US); Lance White, Cincinnati, OH (US)

(73) Assignee: Conscious Dimensions, LLC, Cincinnati, OH (US)

( * ) Notice: Subject to any disclaimer, the term of this patent is extended or adjusted under 35 U.S.C. 154(b) by 979 days.

This patent is subject to a terminal disclaimer.

(21) Appl. No.: 14/200,224

(22) Filed: Mar. 7, 2014

Related U.S. Application Data (63) Continuation of application No. 13/856,650, filed on Apr. 4, 2013, now Pat. No. 8,708,705.

(60) Provisional application No. 61/621,131, filed on Apr. 6, 2012.

(51) Int. Cl.
*A63F 13/00* (2014.01)
(52) U.S. Cl.
CPC .................................. *A63F 13/00* (2013.01)
(58) Field of Classification Search
CPC ....................................................... A61B 5/167
USPC ................................................. 434/236, 238
See application file for complete search history.

(56) References Cited

U.S. PATENT DOCUMENTS

| | | | |
|---|---|---|---|
| 7,389,799 B2 | 6/2008 | Clanton et al. | |
| 7,478,047 B2 | 1/2009 | Loyall et al. | |
| 8,250,144 B2 | 8/2012 | Blattner et al. | |
| 8,478,187 B2 | 7/2013 | Faulkenberry et al. | |
| 8,612,363 B2 | 12/2013 | Karkanias et al. | |
| 2002/0010584 A1* | 1/2002 | Schultz | G06Q 99/00 704/270 |
| 2004/0075677 A1* | 4/2004 | Loyall | G06T 13/40 715/706 |
| 2004/0208369 A1* | 10/2004 | Nakayama | G06K 9/228 382/173 |
| 2005/0175970 A1* | 8/2005 | Dunlap | G09B 5/06 434/185 |

(Continued)

OTHER PUBLICATIONS

Arthur, K., et al., "The Nature of Love: Understanding the Enneagram Types as Nine Expressions of Attachment", The Enneagram Journal, Jul. 2010, pp. 6-22.

(Continued)

*Primary Examiner* — Bruk A Gebremichael
(74) *Attorney, Agent, or Firm* — Frost Brown Todd LLC (57) ABSTRACT

An individual can be presented with information which could provide such individual with an improved understanding of how people with different personality types and levels of consciousness could perceive and address disruptive events. This presentation of information can be in the form of a computer game in which a player can guide an avatar through increasing levels of consciousness, observing how the avatar perceives and addresses disruptive events at each level. Such a computer game can include multiple avatars representing different personality types, and can be configured so that the player would use avatars representing each personality type in the course of completing the game.

16 Claims, 2 Drawing Sheets

(56) References Cited

U.S. PATENT DOCUMENTS

| | | | |
|---|---|---|---|
| 2007/0066916 A1 | 3/2007 | Lemos | |
| 2009/0163777 A1* | 6/2009 | Jung | A61B 5/04842 |
| | | | 600/301 |
| 2009/0224047 A1* | 9/2009 | Johnston | G06K 7/10792 |
| | | | 235/449 |
| 2009/0300513 A1 | 12/2009 | Nims et al. | |
| 2010/0207877 A1* | 8/2010 | Woodard | G06F 3/013 |
| | | | 345/156 |
| 2011/0047486 A1 | 2/2011 | Jones et al. | |
| 2011/0212782 A1* | 9/2011 | Thompson | A63F 13/02 |
| | | | 463/40 |
| 2011/0250575 A1 | 10/2011 | Kalvachev et al. | |

OTHER PUBLICATIONS

Asdornnithee, S., "When a Five Wants to Grow: Using Autoethnography to Examine Inner Changes through the Eyes of the Enneagram", The Enneagram Journal, Jul. 2010, pp. 87-104.

Bartlett, C., "Viewing Therapy through a New Lens", The Enneagram Journal, Jul. 2010, pp. 23-32.

Clouzot, O., "Holistic Introduction to the Levels of Consciousness", The Enneagram Journal, Jul. 2010, pp. 105-118.

Condon, T., "The Trouble with Typing", The Enneagram Journal, July 2616, pp. 146-161.

Ehrlich, S., "Biofeedback: Overview," University of Maryland Medical Center, Sep. 10, 2011, accessed from : http://umm.edu/health/medical.altmed/treatment/biofeedback.

Giggins, O.M., et al., "Biofeedback in rehabilitation," Journal of Neuroengineering and Rehabilitation, 2013, 10:60.

Hall, D., with Taylor, K., Book Review, The Enneagram Journal, Jul. 2010, at. pp. 162-171 reviewing Rhodes, S., The Positive Enneagram: A New Approach to the Nine Personality Types, Seattle, WA: Geranium Press, 2009, 230 pp.

McCraty, R., et al., "Science of the Heart: Exploring the Role of the Heart in Human Performance," HeartMath Research Center, 2001, pp. 13-14.

Ooten, D., et al., "Consciousness Ascending: Levels of Consciousness and the Enneagram", The Enneagram Journal, July 2010, pp. 33-58.

Stevens, K., "The Enneagram: Fundamental Hieroglyph of a Universal Language", The Enneagram Journal, Jul. 2010, pp. 119-145.

"The HeartMath Definition: Heart Rate Variability," Institute of HeartMath Newsletter, Summer 2011—vol. 10/No. 2, p. 15.

Thomas, G., "Archtype and Imagery in the Enneagram", The Enneagram Journal, Jul. 2010, pp. 59-78.

Sikora, M., Book Review, The Enneagram Journal, Jul. 2010, pp. 172-175, reviewing Wagele, E., et al., The Career Within You.

Wagner, J. Ed., et al., The Enneagram Journal, Jul. 2010.

Whiteside, B., "Listening from a Type Perspective", The Enneagram Journal, Jul. 2010, pp. 79-83.

Whiteside, B., "Seeing Your Child", The Enneagram Journal, Jul. 2010, pp. 84-86.

* cited by examiner

CONSCIOUSNESS RAISING TECHNOLOGY

CROSS REFERENCE TO RELATED APPLICATIONS

This is a continuation of U.S. non-provisional application Ser. No. 13/856,650, filed Apr. 4, 2013 which is itself a non-provisional of provisional application 61/621,131, filed on Apr. 6, 2012, the disclosures of which are hereby incorporated by reference in their entireties.

BACKGROUND

There is no shortage of products and services for individuals who desire to improve themselves, whether through acquiring new skills, learning new facts, enhancing their physical fitness, or through other types of activities. However, these existing products and services, even when ostensibly aimed at improving an individual's interpersonal relationships, generally fail to impart any meaningful understanding of how either an individual's mind works, or how the minds of those around him or her work. Similarly, existing products and services do not offer approaches which can address both (or, in may cases, either) ontogenetic and phylogenetic influences on thought processes. Accordingly, there is a need in the art for technology which can be used to help an individual to understand his or her own thought processes, and/or obtain other benefits such as raising an individual's level of conscious development.

SUMMARY

Disclosed herein is technology which can be implemented in a variety of ways, including in creating repeatable, predictable and reliable methods of changing how an individual's thought processes work so that the individual can better understand and interact with those around him or her, and/or better understand his or her own motivations and desires. One approach which can be taken in implementing this technology is to incorporate it into an interactive computer program which demonstrates to its users how people with different personality types and at different levels of personal development will likely react to adversity. Other approaches are also possible, and will be immediately apparent to those of ordinary skill in the art in light of the disclosure set forth herein. Accordingly, the examples given in the summary of potential approaches to implementing the disclosed technology should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

The inventors have conceived of novel technology which, for the purpose of illustration, is disclosed herein as applied in the context of a computer game which can be used to help the player understand how people (including the player himself or herself) perceive and react to disruptive events. As will be apparent to one of ordinary skill in the art, such a computer game is only one potential implementation of the inventors' technology, and other methods, machines, and articles of manufacture could be implemented by those of ordinary skill in the art without undue experimentation in light of this disclosure. Accordingly, the examples set forth herein should be understood as being illustrative only, and not limiting.

Figure 1:
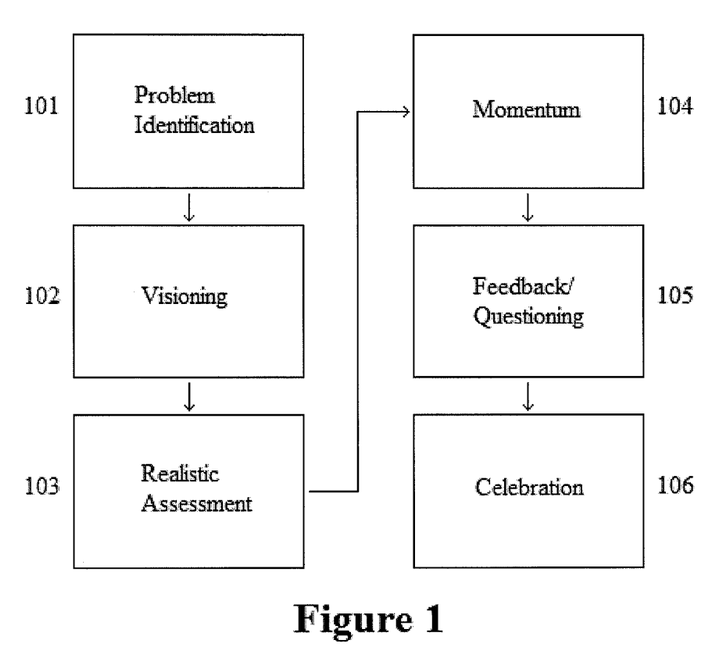
FIG. 1 illustrates a basic process which can be used to illustrate how people with different personality types and levels of consciousness development can perceive and react to problems.

Turning now to FIG. 1, that figure illustrates a basic process which can be used by people with different personality types and levels of consciousness development to perceive and react to disruptive events. In a computer game implemented according to this disclosure, a player's in-game character (referred to herein as his or her avatar) could be faced with various disruptive events, and could respond to those events by completing the steps of the process of FIG. 1. By allowing a player's avatar to learn and advance through various levels of consciousness in the course of dealing with disruptive events and their consequences, and by allowing (or requiring) a player to use multiple avatars representing different personality types, a computer game implemented according to this disclosure can teach a player how all types of people react to disruptive events at various levels of consciousness.

The first part of the process of FIG. 1 is a problem identification phase [101]. In a computer game, this phase could comprise allowing a player's avatar to explore his or her setting and/or interact with computer controlled characters who have been influenced by, are being influenced by, or will be influenced by, a disruptive event. Consistent with the variety of possible simulated experiences made possible by video games, and the variety of ways in which people having different personality types and levels of consciousness perceive disruptive events, in various embodiments, this interaction can take a variety of forms. To illustrate, consider the case of a computer game in which the player's avatar is an inhabitant of an undersea community, and the disruptive event is a series of massive tidal waves which will be caused by an upcoming meteor shower. In such a case, the problem identification phase [101] could include dialogue between the player's avatar and various computer controlled characters in which the computer controlled characters could provide clues to the nature of the disruptive event and the consequences which might flow from it (e.g., by expressing fear of the upcoming meteor shower, expressing concern that meteors might land in the water, remembering damage caused by smaller meteor showers in the past, or extrapolating the threat posed by large waves).

However, a problem identification phase [101] might not require dialogue with computer controlled characters, and might alternatively (or additionally) include allowing a player to gather information by instructing his or her avatar to examine his or her surroundings. For example, in response to a player using a "look" command to examine a certain type of plant, the player could be presented with a message that the plant appeared to be setting down deeper roots, and that it only did so when there was some kind of disturbance coming. Similarly, in some implementations, the player's avatar might be faced with hostile characters (e.g., wild animals in a wilderness), and the nature of the hostile characters and/or how they interact with the player's avatar (e.g., act more aggressively, act less aggressively, attack in groups, etc) might be used to provide clues to the disruptive event. Combined approaches are also possible. For example, in some implementations, a player's avatar may be attacked by groups of wild animals in a wilderness, and separately be informed during dialog with a computer controlled character that the particular type of wild animal which attacked the player's avatar only hunts in groups when there is some kind of impending astronomical disturbance.

As set forth above, the problem identification phase [101] can include various types and combinations of activities to allow a player to identify a disruptive event. The particular types of activities and combinations in any particular problem identification phase [101] can vary from implementation to implementation, and may, in some implementations, be defined largely by the decisions of the player himself or herself. For example, consider a case where there are a variety of clues that a disruptive event will take place, and a variety of consequences which the disruptive event can be expected to have if it occurs. In such a case, a computer game could be implemented to continue in the problem identification phase [101] until the player had gathered sufficient clues to indicate that the disruptive event would take place, and what its likely consequences would be, but might not impose restrictions on how those clues could be obtained (e.g., the player might gather all the clues through dialogue with computer controlled characters, through combat with hostile characters, through interactions with his or her environment, or through some combination of different types of activities).

What approaches and combinations of activities are supported in a particular implementation can be determined based on a variety of factors, such as desired game play experience (e.g., do the game designers want the game to focus primarily on dialog, primarily on combat, or something else) or intended audience (e.g., a game intended for mature audiences might allow a player to gain information by having his or her avatar engage in romantic liaisons with computer controlled characters). Alternatively, the types of activities provided for a player's avatar can be chosen to provide further insight for the player into how different people can perceive and react to disruptive events. To illustrate, consider that, in a preferred embodiment, different avatars a player can use as his or her in-game character can be used to represent the nine personality types from the well known Enneagram personality typing system. In such an embodiment, the different avatars could have head/heart/body orientations such as set forth in table 1 below.

TABLE 1

Exemplary Head/Heart/Body Orientations
Corresponding to Enneagram Personality Types

|  | Head | Heart | Body |
|---|---|---|---|
| Type 1 | 10% | 15% | 75% |
| Type 2 | 5% | 90% | 5% |
| Type 3 | 5% | 85% | 5% |
| Type 4 | 10% | 75% | 15% |
| Type 5 | 90% | 5% | 5% |
| Type 6 | 85% | 5% | 10% |
| Type 7 | 75% | 5% | 20% |
| Type 8 | 5% | 5% | 90% |
| Type 9 | 5% | 10% | 85% |

The game could then be implemented to require or encourage the players to cause their avatars to engage in activities appropriate to their orientation, such as by making an activity which is appropriate to an avatar's orientation more likely to succeed (e.g., an avatar with a body orientation could be more likely to succeed in combat with hostile characters, while an avatar with a mind orientation could be more likely to gather important clues by examining his or her surroundings). An illustrative mapping between different orientations and activities which could be included in a problem identification phase [101] is set forth below in table 2.

TABLE 2

Exemplary Mapping Between Head/Heart/Body
Orientations and Activities An Avatar Could Engage In

| Orientation | Activities |
|---|---|
| Head | Examining surroundings; researching in books or records; solving riddles. |
| Heart | Dialog; helping other characters; in-game political activity. |
| Body | Combat; building; farming. |

As an alternative, instead of a problem identification phase [101] being characterized by gathering clues using activities which reflect an avatar's head/heart/body orientation, in some implementations the problem identification phase [101] might be structured so that the player would be required to engage in activities that are contrary to the head/heart/body orientation of his or her avatar. For example, a problem identification phase [101] could be implemented so that a player is only able to move forward to the visioning phrase [102] (discussed infra) after the player had caused some specified change in his or her avatar's head/heart/body orientation. In such an implementation, the head/heart/body orientations listed in table 1 could be used only at the start of the game, and the player might only be allowed to move from the problem identification phase to the visioning phase when his or her avatar had achieved a head/heart/body orientation which was appropriate to allow him or her to move to the next level of consciousness (discussed infra). As an illustration of this, table 3, below, sets forth exemplary head/heart/body orientations which could characterize a type 2 personality at various levels of consciousness.

TABLE 3

Exemplary Head/Heart/Body Progression

|  | Head | Heart | Body |
|---|---|---|---|
| Level 1 | 5% | 85% | 10% |
| Level 2 | 10% | 75% | 15% |
| Level 3 | 30% | 45% | 20% |
| Level 4 | 30% | 45% | 25% |
| Level 5 | 30% | 40% | 30% |
| Level 6 | 35% | 35% | 30% |
| Level 7 | 35% | 35% | 30% |

Such progression could be supported in a variety of manners. For example, there could be head/heart/body points that the player's avatar could earn by engaging in activities that correspond to specific orientations (e.g., as shown in table 1). Once the player had earned enough points to bring his or her avatar's head/heart/body orientation into a proper balance, he or should could be allowed to move on to the visioning phase [102] (e.g., a new location or interaction which would reveal the nature of the disruptive event could be unlocked). Similarly, in some implementations, head/heart/body points might be lost by not engaging in activities which are appropriate for a particular orientation. This could not only make it easier for a player to achieve the appropriate head/heart/body orientation, but could also provide the player with concrete exposure to the fact that it is generally necessary to constantly work even to maintain a given level of proficiency, and the fact that the benefits of becoming a more balanced individual can sometimes outweigh the drawbacks of sacrificing proficiency in a highly over-developed skill.

Changes to head/heart/body orientation could be used to provide the player with direct exposure to the benefits of becoming a more balanced individual in other ways as well. For example, in some cases, a game could be implemented to gather information from peripherals which would reflect the player's head/heart/body activity in the course of the game. To detect the player's body activity, a game could gather information from devices such as heart rate monitors, blood pressure monitors, breathing rate monitors, and other similar devices. To detect the player's head activity, a game could gather information from devices such as brain wave scanners (which could detect concentration states) or software such as facial recognition software that is configured to detect contemplative expressions. To detect the player's heart activity, a game could gather information from devices such as EmWave detectors and software such as software configured to detect variability in time between heartbeats (with lower variability reflecting lower heart activity). Once gathered, this information could be used by the game so that the avatar's head/heart/body orientation is modified to match the data from the player (e.g., if the player's breathing and heart rate increases, the player's avatar could have their body points increase as well). In this way, a game could provide a player with an incentive to become more balanced, resulting in both in-game and real world benefits.

Other variations on the use of head/heart/body information to control game progress are also possible. For example, there are numerous approaches to controlling progression through different head/heart/body orientations. In some implementations, in order to ensure an orderly progression through the different levels of consciousness, a game could be implemented to only provide a player with sufficient activities for a problem identification phase [101] that, if the player completes all of the activities, then his or her avatar would achieve the correct head/heart/body orientation to proceed to the next level. In such an orientation, once the player had completed all of the activities, then he or she could advance. In other implementations, a player could be allowed to engage in activities without restriction, but the effect of those activities would be limited to facilitate the desired progression. For example, activities which correspond with the different orientations could be organized according to levels (e.g., defeating powerful monsters could be a higher level activity than defeating weaker monsters), and the points a player could earn by engaging in those activities could be limited by those levels (e.g., a player with 100 body points could gain more points by defeating a certain class of monster, while a player with 1000 body points would gain no additional points for performing that same act). In this type of implementation, the types of activities a player could engage in might be restricted (e.g., to enable a body oriented avatar to achieve greater balance, a game could present only lower level body challenges for that avatar), but the player could perform (or not perform) whatever activities he or she desired within the types provided by the game.

As similar effect could be achieved in implementations where a player gradually loses points by having the rate of point loss increase with the number of points the player has, and by restricting the activities the player could engage in to make it more likely that the player would reach a desired equilibrium. Additionally, in some implementations, players could be provided with some kind of guide (e.g., an oracle, a trusted authority figure, a seer, etc) who could inform the player what type of head/heart/body orientation should be obtained in order to proceed, and who could potentially suggest the types of activities the player could engage in to attain the desired orientation. This could both make it more likely that a player would achieve the correct orientation, and make it less likely that the player would become frustrated by a lack of success associated with engaging in the types of activities that his or her avatar is ostensibly best at (e.g., combat, for a character for a high body alignment).

Of course, it should be understood that use of head/heart/body orientation as described above is not a requirement for all implementations. For example, instead of focusing on head/heart/body orientation to determine activities to be performed during a problem identification phase [101], in some implementations, a player could be required to cause his or her avatar to engage in both active and receptive activities before he or she could complete the problem identification phase [101]. Such an approach could be used in implementations where a computer game is intended to illustrate that, to progress in life, a person must be able to understand both the active and receptive aspects of his or her personality so that he or she can combine them into a unified whole. Of course, combined approaches are also possible. For example, in some implementations there could be both active and receptive versions of the activities set forth in table 2 (e.g., engaging in dialogue versus eavesdropping on a conversation), and a game could be implemented as described above to require or encourage the player to engage in active and passive versions of the activities which reflect the orientation of his or her avatar.

Of course, it should be understood that, while the discussion above focused on implementations in which a problem identification phase [101] proceeds by a player gathering clues to a disruptive event, the inclusion of a problem identification phase [101] implemented in this manner is not a requirement for computer games implemented according to this disclosure. For example, in some implementations, rather than being required to gather clues, a player could simply be informed of the upcoming disruptive event. In this type of implementation, a game could start by presenting a video depicting the player's avatar being informed by some unimpeachable source (e.g., a divine oracle or seer) that there would soon be a meteor shower which would trigger massive tidal waves. Combined approaches are also possible. For example, in some implementations, there could be a location in the avatar's setting (e.g., a temple) which could contain characters who, once the player had explored sufficiently (e.g., gathered sufficient clues) would explain the disruptive event. Additional approaches with various levels of interactivity and required problem solving, such as where a player has the opportunity to gather clues as to a disruptive event, but can alternatively go to a library or other repository of knowledge to simply learn of the event, are also possible, and will be immediately apparent to those of ordinary skill in the art in light of this disclosure. Accordingly, the discussion of the problem identification phase [101] set forth above should be understood as being illustrative only, and not limiting on the protection accorded by this, or any related, document.

Moving forward with the process shown in FIG. 1, after the problem identification phase [101] is complete, the process continues with a visioning phase [102]. In this phase, the player will select a course of action for addressing the disruptive event. As with the process of learning about the disruptive event in the problem identification phase [101], the process of selecting a course of action during the visioning phase [102] can take place in a variety of ways. For example, consider a case where there are two possible courses of action which can be used to address a disruptive event, a military course of action and a diplomatic course of action. In some implementations, a player would select between these courses of action by simply inputting a choice into the interface presented by the computer game (e.g., by pressing a first button for the military course of action, or pressing a second button for the diplomatic course of action). However, in other approaches, the selection would require more active in-game interaction. For example, to select the military course of action, the player could be required to guide his or her avatar to a computer controlled character or location representing the military course of action (e.g., a general, or an armory).

The visioning phase [102] might also include presenting information to the player indicating why an individual might choose certain courses of action. For example, in an implementation where different courses of action are presented to a player as textual descriptions, the textual descriptions might describe not only the courses of action to be chosen, but also what would motivate those choices (e.g., "Daphnari chooses to kill her husband the King as a sacrifice to the God for he has been found out to be the perpetrator and cause of these events for he was responsible to carry out rituals that would ensure the appeasement of the gods. She believes to kill the man she loves will save her people. Sacrificing her love will break her heart!"). Alternatively, in an implementation in which a player chooses a course of action by engaging in some actions (e.g., talking to a computer controlled character representing the chosen course of action), the actions the player would engage in could illustrate the thought processes which could drive the player's avatar to make a given choice (e.g., through dialog with the character representing the chosen course of action). Of course, other variations are possible, and will be immediately apparent to those of ordinary skill in the art. Indeed, as set forth below, in some implementations, some of the actions described above in the context of the visioning phase [102] could be included in other phases from the process of FIG. 1. Accordingly, the discussion above should be understood as being illustrative only, and not limiting.

After the visioning phase [102], the process of FIG. 1 continues with a realistic assessment phase [103]. This phase can be implemented to require the player to guide his or her avatar through steps preparing for the course of action he or she has chosen. For example, in the case where the course of action chosen in response to a meteor shower is for the player's avatar to sacrifice himself or herself by channeling his or her essence into a barrier, the realistic assessment phase [103] may include the avatar exploring his or her setting to gather reagents used in casting a barrier spell. Additionally, in some implementations, this type of exploration could be combined with interactions which would reveal the avatar's motivations. For example, one of the reagents might be an item that is within the possession of a computer controlled character and, in order to retrieve the item, the avatar would have to engage in a dialog and explain his or her motivations to the computer controlled character (e.g., "This act of self sacrifice will win the affection and love of the other inhabitants of the village.").

Variations are also possible. For example, during the realistic assessment phase [103], the avatar could simply interact with his or her surroundings and computer controlled characters, giving the player a chance to learn more about the avatar through his or her dialog and activities. Once some triggering event had taken place, the realistic assessment phase [103] could transition to the momentum phase [104] where the course of action from the visioning phase [102] would actually be implemented. To illustrate how this could take place, consider the case where an avatar would have three motivations to sacrifice himself or herself (e.g., desire to win the affection and love of others, feelings of duty, and a desire to atone for past mistakes). Once the avatar had engaged in activities or dialogues which revealed those motivations, he or she could be summoned to a special location to generate a barrier to deflect the meteors. Other variations, such as implementations in which motivations are revealed in the visioning phase [102], and the transition from the realistic assessment phase [103] to the momentum phase [104] is triggered by some other kind of event (e.g., the player causing his or her avatar to engage in set number of interactions, a timer expiring, achieving a specified head/heart/body orientation, etc) are also possible. Accordingly, the discussion of the realistic assessment phase [103], like the discussions of the problem identification [101] and visioning phases should be understood as being illustrative only, and not limiting.

After the realistic assessment phase [103], the process of FIG. 1 proceeds to the momentum phase [104], in which the player is presented with the implementation of the course of action from the visioning phase [102]. This could be accomplished in a variety of manners. For example, the implementation could be presented in the form of non-interactive information, such as a cut scene of a barrier failing as meteors fall from the sky, or a flashback with a textual description of the course of action and its success or failure. Interactive implementations are also possible. For example, a player could be presented with a mini-game requiring his or her avatar to move across a screen to deflect falling meteors. Depending on the implementation, this mini-game could be designed to allow a player to implement the course of action in a manner which would successfully mitigate or eliminate the negative consequences of the disruptive event, or might be designed to inevitably grind the player down and defeat him or her (e.g., by having the meteors continue to come in greater numbers and at greater speeds until the player is unable to guide his or her avatar to block them all). Variations in which the information presented to the player varies depending on the player's overall progress in the game are also possible (e.g., where the player is allowed to win the mini-game if he or she has successfully guided his or her avatar to a sufficiently high level of consciousness).

After the momentum phase [104], the process of FIG. 1 proceeds to a feedback/questioning phase [105]. In this phase, the player can be presented with the consequences of the disruptive event (e.g., a tidal wave may have washed away the avatar's loved ones), and can be presented with the avatar's reaction to consequences of the course of action (e.g., if the course of action failed in the momentum phase [104], the player could be shown his or her avatar's reaction to the failure of the course of action). This could take the form of, for example, the player using his or her avatar to explore the post-event setting to discover the consequences of the event (e.g., loved ones are no longer present, witnesses may have seen them getting washed away), and demonstrating the avatar's reaction through his or her interactions with computer controlled characters and his or her surroundings (e.g., the avatar finding that his or her loved ones have washed away could trigger an internal monologue in which the avatar reviles other characters for not displaying the same level of self-sacrifice as the avatar himself or herself had displayed). As with the problem identification phase [101] (as well as, depending on the implementation, other phases in which the player's avatar is required to engage in interactions or perform tasks), this feedback/questioning phase [105] can be implemented so that the player would be required to guide his or her avatar through actions characteristic of the avatar's orientation (i.e., head/heart/body), and/or actions reflecting both active and receptive characteristics in the process of achieving the objectives of the feedback/questioning phase [105].

In addition to, or as an alternative to, presenting the player with the consequences of, and the avatar's reaction to, the course of action implemented in the momentum phase [104], the feedback/questioning phase [105] could also include presenting the player with a prompt (e.g., a riddle presented by a spirit guide or familiar for the avatar) encapsulating deficiencies in the course of action chosen during the visioning phase [102]. In an implementation including such a prompt, there could also be some form of feedback taken from the player himself or herself and used to determine if the player had contemplated the message. Such feedback could be, for example, collection of physiological information from the user (e.g., measurement of galvanic skin response, heart rate, direction of gaze, etc) followed by the use of that physiological information to determine if the user is in a physical state consistent with contemplation (e.g., skin surface conductivity decreases, heart rate decreases, user's direction of gaze becomes stable, etc).

After the feedback/questioning [105] phase is complete, the process of FIG. 1 could transition to a celebration phase [106] in which the player can be presented with the avatar's reaction to contemplating the information presented during the feedback/questioning phase [105]. From a standpoint of a computer game, this phase can be used to provide a reward for the player completing the process of FIG. 1 and contemplating the consequences of the approach to addressing disruptive events exemplified by the course of action chosen in the visioning phase [102]. Such a reward could be an in-game reward (e.g., an item which would increase the abilities of the player's avatar) a reward for the player (e.g., a cut scene or certificate of completion), or both (e.g., an in-game reward and a cut scene illustrating the avatar's reaction). In this way, the player would be provided with positive reinforcement for learning about, and contemplatively reflecting on, a particular way of perceiving and addressing disruptive situations, thereby improving the player's ability to perceive and address disruptive events in his or her own life, as well as improving the player's understanding of how other people might make decisions and perceive the world.

While, as set forth above, a computer game could have beneficial effects simply by guiding a player through a process as shown in FIG. 1, in a preferred embodiment, the process of FIG. 1 would be repeated one or more times to illustrate a variety of different approaches to perceiving and addressing disruptive events. For example, after completing the process of FIG. 1, a new iteration of that process could be initiated in which the avatar is faced with a situation where the disruptive event is (or the disruptive events are) consequences of the avatar's actions from the previous iteration. The player could then go through a process similar to that described above, except that, in the second iteration, the player could be presented with choices reflecting a higher level of consciousness than his or her avatar had attained in the previous iteration.

Examples of levels of consciousness that a player could guide his or her avatar through are presented below in table 4.

TABLE 4

Characteristics of progressively increasing levels of consciousness

| Level Number | Level Characteristics |
|---|---|
| 0 | A person at this level reacts instinctively to situations and tries to survive moment to moment. This level will preferably not be included in an implementation of the disclosed technology, since almost all individuals have progressed beyond this level in their own lives. |
| 1 | A person at this level desires to keep his or her deity or deities happy and the members of his or her community safe. |
| 2 | A person at this level does what he or she wants regardless of consequences. |
| 3 | A person at this level desires to do right, sacrificing now for rewards later. |
| 4 | A person at this level values logic, competition, success, optimism and progress. |
| 5 | A person at this level becomes highly idealistic and believes that all are equal. |
| 6 | A person at this level moves beyond self-centered, instinctual and emotional drives to benefit themselves and others. |
| 7 | A person at this level sees a conscious collective, which equally serves both the whole and the individual. |

Iterations to consciousness levels beyond those set forth in table 3 are also possible. For example, characteristics of levels beyond those shown in table 3 can be defined by treating levels 0-5 a first tier in which an individual's characteristics are driven by passions and fixations (e.g., melancholy, envy, doubt, fear, vengeance, desire for excess, etc), with characteristics of subsequent levels being defined by replacing passions and fixations with holy virtues and holy ideas (e.g., honesty, law, courage, faith, innocence, truth, etc). In such a scheme, level 6 would correspond with level 0, in that an individual at level 6 would have the same basic objectives as an individual at level 0. However, the objectives at level 6 would be expressed differently due to the level six individual focusing on holy virtues and holy ideas rather than fixations and passions, and therefore perceiving himself or herself as part of a unitary "we" rather than an isolated individual.

For the purpose of providing further illustrations of how fixations and passions could be replaced with holy virtues and holy ideas to define higher levels of consciousness, table 5, below provides a listing of fixations and passions, and corresponding holy virtues and holy ideas for each of the nine Enneagram personality types. While the use of such holy virtues and holy passions is not required to implement the disclosed technology, such holy virtues and holy ideas could be used in some cases to explain the differing levels of consciousness to players, or to define additional levels of consciousness as described above.

TABLE 5

Exemplary fixations, passions, holy virtues and holy ideas for each of the nine enneagram personality types.

| | Fixation | Passion | Holy Virtue | Holy Idea |
|---|---|---|---|---|
| Type 1 | Judgment | Anger | Serenity | Holy Perfection |

TABLE 5-continued

Exemplary fixations, passions, holy virtues and holy ideas for
each of the nine enneagram personality types.

|        | Fixation       | Passion                              | Holy Virtue         | Holy Idea        |
|--------|----------------|--------------------------------------|---------------------|------------------|
| Type 2 | Flattery       | Pride                                | Humility            | Holy Will        |
| Type 3 | Vanity         | Deceit                               | Veracity/Honesty    | Holy Law         |
| Type 4 | Melancholy     | Envy                                 | Balance/Equanimity  | Holy Origin      |
| Type 5 | Witholding     | Avarice (Greed)                      | Nonattachment       | Holy Omniscience |
| Type 6 | Doubt          | Fear                                 | Courage             | Holy Faith       |
| Type 7 | Planning       | Gluttony                             | Constancy/Sobriety  | Holy Plan        |
| Type 8 | Vengeance      | Lust (Excess)                        | Innocence           | Holy Truth       |
| Type 9 | Self forgetting| Indolence (Sloth Self-Forgetting)    | Right Action        | Holy Love        |

Of course, it should be understood that, while the technology disclosed herein could be used to implement a computer game in which a player guides his or her avatar through progressive levels of consciousness, it is possible that more fluid transitions between levels of consciousness could also be possible. For example, in some cases, the courses of action presented to a player during the visioning phase [102] could be based on courses of action that an individual having the personality type of the player's avatar would adopt at different levels of consciousness.

Figure 2:
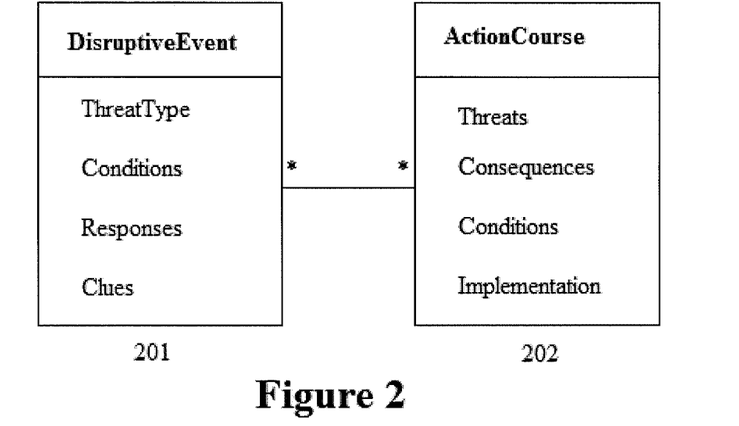
FIG. 2 illustrates an exemplary set of data structures.

To illustrate, consider a situation where a type 2 personality at the second level of consciousness is faced with the disappearance of his or her children, as well as with demands from his or her community for justice, after a meteor strike. In an implementation where the player's avatar steadily progresses through the levels of consciousness, the visioning phase [102] could present the player with a course of action which is consistent with the second level of consciousness (e.g., find someone to blame for the damage caused by the meteor strike) and, after the player has seen the effect of that course of action, could move to the third level of consciousness. However, it is also possible that, in the visioning phase [102], the player could be presented with multiple courses of action corresponding to the level of consciousness for his or her avatar, as well as immediately higher and lower levels of consciousness (e.g., a level one course of action, such the avatar sacrificing a position of responsibility to find his or her offspring, and/or a level three course of action, such as the avatar rebuilding his or her community without finding a scapegoat or searching for his or her lost loved ones). Then, depending on the course of action chosen by the player, his or her avatar could progress to a higher level of consciousness, stay at the same level of consciousness, or even regress to a previous level. This type of flexibility can be supported using data structures representing stock disruptive events, consequences and courses of action. An exemplary set of data structures which could be used for this purpose is illustrated in FIG. 2. A discussion of those structures, and the data members they contain, is set forth below.

In FIG. 2, a data structure representing a disruptive event [201] is shown as having data members ThreatType, Conditions, Responses, and Clues. The ThreatType data member can be used to store data indicating the type of threat posed by the disruptive event (e.g., threats to physical safety of the avatar, threats to the spiritual well being of the avatar's community). The Conditions data member can be used to store data indicating pre-requisites for the disruptive event (e.g., characteristics of the game state showing the player's progress or past activities). The Responses data member can be used to indicate what courses of action can be used to respond to the disruptive event (e.g., by storing links to data structures representing those courses of action). The Clues data member can be used to indicate how the disruptive event could be revealed to the player (e.g., pointers to instructions defining scenes where the disruptive event is described, and/or statements that computer controlled characters could make to reveal disruptive event). Note that the data structure used to represent a disruptive event [201] could also be used to represent consequences of courses of action. Indeed, as set forth previously, in some implementations, the consequences of a course of action selected in one iteration could form the disruptive event for a subsequent iteration, a relationship naturally represented using a single data structure type.

As a complement to the data structure for a disruptive event, FIG. 2 also illustrates an ActionCourse data structure [202], representing courses of action which could be chosen to address disruptive events. As shown in FIG. 2, such a data structure could have data members of Threats, Consequences, Conditions, Implementation. The Threats data member could be used to store data indicating the types of threats that the course of action could be used to counter (e.g., e.g., threats to physical well being, threats to spiritual well being). The Consequences data member could be used to indicate likely consequences of the course of action (e.g., by storing links to data structures representing the consequences, which could be the same type of data structure used for representing disruptive events). The Conditions data member, like the similar data member in the DisruptiveEvent data structure [201] could be used to store pre-requisites for the disruptive event. Finally, the Implementation data member could be used to indicate how the course of action would be presented to the player (e.g., a pointer to a mini-game the player would play to represent the course of action).

Figure 3:
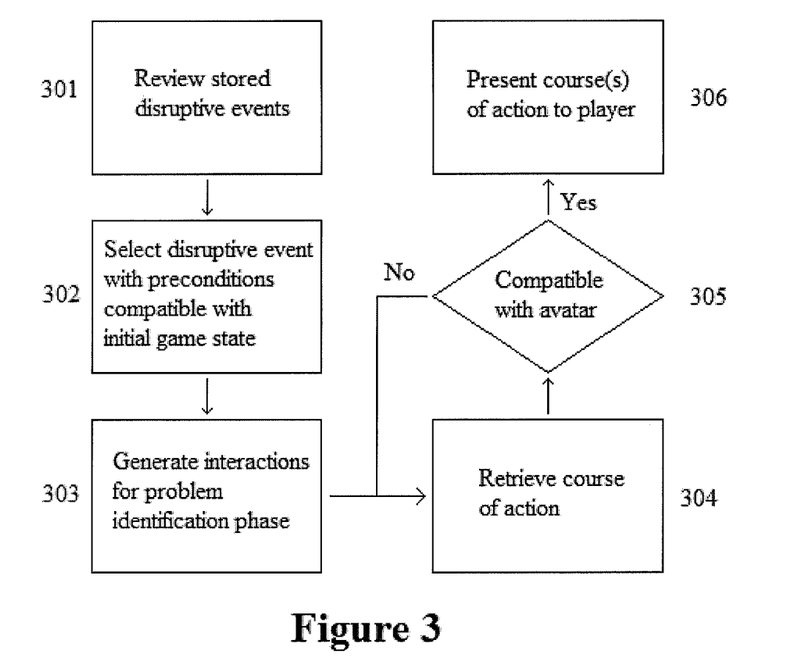
FIG. 3 illustrates a flowchart which could be used to generate a narrative.

To illustrate how data structures such as shown in FIG. 2 could be used to create a narrative, consider the flowchart of FIG. 3. In that flowchart, initially, the computer executing the game software could review the potential disruptive events and select a disruptive event having pre-conditions matching the initial game state (e.g., a natural disaster, which might take place at any time during the game). The clues data member for the disruptive event could then be used to generate the interactions which would take place during the problem identification phase [303] (e.g., by populating the dialog of computer controlled characters with statements or phrases stored as part of the clues data member).

Once the problem identification phase is complete, the process of FIG. 3 could continue by generating the visioning phase. This could take place by retrieving courses of action [304] from the Responses data member, and choosing a course of action which is consistent with the consciousness level of the player avatar [305] (e.g., an avatar at a first level of consciousness will be more likely to choose a course of action which counters threats to the physical well being of those around him or her, rather than a course of action which counters threats to the long term spiritual health of his or her community). The course of action could then be presented to the player [306] so that he or she could complete the visioning phase. Alternatively, as shown in FIG. 3, and as discussed above, multiple courses of action might also be presented. This could be achieved by making a slight modification to the selection of courses of action, so that, instead of only selecting a course of action which is compatible with the avatar's level of consciousness, multiple courses of action are selected (e.g., one at the avatar's current level of consciousness, one at the next lower level of consciousness, and one at the next higher level of consciousness). Tables showing types of actions which would be taken by avatars having different personality types at different levels of consciousness, and which could be used in determining compatibility of certain types of actions with a player's characteristics, or for generating the courses of action which would be presented to a player are set forth below in tables 6-12.

TABLE 6

Exemplary actions for different personality types at the first level of consciousness.

| | Actions |
|---|---|
| Type 1 | Passes down orally the tales and stories from the gods |
| Type 2 | Mending, cooking, cleaning, nurturing |
| Type 3 | Perform magic, fight opponents with magic |
| Type 4 | Experiences the gods, gathering magical info & sharing |
| Type 5 | Collect and use sacred objects and texts to gather info |
| Type 6 | Investigates, patrols and informs the tribe and chief |
| Type 7 | Entertains and tells stories about the gods and tribe |
| Type 8 | Prays & intercedes/coveys stories/performs ritual |
| Type 9 | Performs and teaches rituals |

TABLE 7

Exemplary actions for different personality types at the second level of consciousness.

| | Actions |
|---|---|
| Type 1 | Slaughter those who disagree |
| Type 2 | Seduce/Serve authority figures |
| Type 3 | Slaughter those in competition |
| Type 4 | Lash out at everyone/killing rampage |
| Type 5 | Build a library and horde knowledge |
| Type 6 | Share intelligence with authority figure |
| Type 7 | Start riots/looting |
| Type 8 | Take control of everything/destroy temples |
| Type 9 | Explore, collect, and converse |

TABLE 8

Exemplary actions for different personality types at the third level of consciousness.

| | Actions |
|---|---|
| Type 1 | Go on a crusade, convert and destroy old religions/temples |
| Type 2 | Serve the authority, or if the authority, serve subjects to be loved/worshiped |
| Type 3 | I am God's chosen, I will build a castle, establish a throne, build an army |
| Type 4 | Destroy own home, take vow of poverty, establish hospital/kitchen shelter |
| Type 5 | Open up library to others, assist others in gathering knowledge |
| Type 6 | Establish a police/military force to serve the king/queen |
| Type 7 | Open a playhouse, challenge authority through theatrical performances |
| Type 8 | If God, or King/Queen be true, take over in their name |
| Type 9 | Teach and train others in the way, establish a school. |

TABLE 9

Exemplary actions for different personality types at the fourth level of consciousness.

| | Actions |
|---|---|
| Type 1 | Work out, train, read, learn, etc. |
| Type 2 | Give resources (gold)/talents to authority |
| Type 3 | Learns a skill and teaches others for profit |
| Type 4 | Manipulate to take (lie, steal, perform) |
| Type 5 | Sells scrolls/books of knowledge/science for profit |
| Type 6 | Invest my savings to create new inventions for profit (explosive weapons) |
| Type 7 | Entreprenurial acts, start new businesses, innovative start up/low costs |
| Type 8 | Build a city in your name, control populous through real estate |
| Type 9 | Franchise a school for profit |

TABLE 10

Exemplary actions for different personality types at the fifth level of consciousness.

| | Actions |
|---|---|
| Type 1 | Object to wrong behavior, establish/organize new orders/groups |
| Type 2 | Give resources to the new groups and "break the bank" giving too much |
| Type 3 | Give funds to establish several hospitals in their name |
| Type 4 | Build a garden center for community gatherings/share feelings, tell stories |
| Type 5 | A professor, teaching subjects that include social and emotional concepts |
| Type 6 | Serve organizations as a social worker to help the underdog (ie type 1's new groups) |
| Type 7 | Invent social services/outreach centers/equalize status |
| Type 8 | Allows others have equal power (ie. Lets them build organizations in his city for low taxes) |
| Type 9 | Has teachers in their school who all teach the same things to avoid conflict/info becomes stagnant |

TABLE 11

Exemplary actions for different personality types at the sixth level of consciousness.

| | Actions |
|---|---|
| Type 1 | Accept groups that have conflicting values, and even partner with them |
| Type 2 | Use resources to secure needs then facilitates opportunities for others |
| Type 3 | Acts on own behalf and does for others in moderation & efficiency |
| Type 4 | Intuitively knows how to love others and gives freely |
| Type 5 | Connects with others and gives deep knowledge from the heart |
| Type 6 | Steps into leadership role, promoting change while supporting others |
| Type 7 | Invent systems that affect global change and solve complex issues |
| Type 8 | Coaches & empowers others to become successful and strong in true power |
| Type 9 | Recognizes own vision and colaborates with others for global change |

TABLE 12

Exemplary actions for different personality types at the seventh level of consciousness.

| | Actions |
|---|---|
| Type 1 | With serene wisdom, I serve all |
| Type 2 | Provides for all with humility |
| Type 3 | Coaches and does for all, with all |
| Type 4 | Includes all and defends the existence of all life |
| Type 5 | Acts on knowledge to be understanding for all |
| Type 6 | Acts courageously and spontaneously to lead the continuation of life |
| Type 7 | Envisions new ways of being for all |
| Type 8 | Lead all in the way of innocence and peace |
| Type 9 | Leads all in the continuation of life with love |

After the visioning phase is complete, the realistic assessment and momentum phases could be generated based on the information associated with the course of action in the same way the problem identification and visioning phases were generated based on the information associated with the disruptive event. The feedback/questioning and celebration phases could then be generated based on the consequences of the course of action and/or the level of consciousness of the avatar. The process could then continue to iterate as discussed previously with respect to FIG. 1. Of course, it should be understood that, while the process of FIG. 3 was discussed in the context of generating a narrative phase by phase, it is also possible that multiple phases, or even an entire narrative, could be generated in one pass (e.g., generating the narrative for an entire iteration (potentially with alternative narratives to account for player choices) of the process of FIG. 1 at the start of the iteration, rather than generating it in a piecewise manner).

While, as set forth above, a computer game implemented according to this disclosure could be created so as to modify the disruptive events and courses of action that would take place at each level of consciousness, those are not the only aspects of a player's experience which could be modified as the player's avatar reaches new levels of consciousness. For example, in some embodiments, different levels of consciousness could be associated with different gemstones and colors (e.g., level one with amethyst, level 2 with ruby, level 3 with sapphire, level 4 with citrine, level 5 with emerald, level 6 with topaz, level 7 with turquoise). In such embodiments, as the player's avatar moved from one level of consciousness to another, his or her surroundings could be shaded with colors reflecting the level of consciousness the avatar had obtained.

Similarly, in some implementations, levels of consciousness could be associated with different Solfeggio sound frequencies and, when an avatar ascends from one level of consciousness to another, this could be reflected by the sound presented to the player. For example, a chime at a given frequency could be played when an avatar changes levels, or background music played in the game could be augmented with a theme set at an appropriate frequency. Of course, in various implementations, sound (whether corresponding to Solfeggio frequencies or otherwise) could be used in various other manners. For example, different frequencies might be associated with different personality types, and the sounds played for the character (e.g., background music) might be determined by that personality type either as an alternative to, or in addition to, being determined by the avatar's level of consciousness. To illustrate how this could be implemented, tables 13 and 14 below provide mappings between sounds, levels of consciousness, and personality types which could be used in some implementations.

TABLE 13

Illustrative Mapping Between Personality Types and Solfeggio Frequencies

| | Musical Note-Solfeggio = Frequency (Hz) |
|---|---|
| Type 1 | G#-417 = 208.50 Hz |
| Type 2 | C-528 = 132.00 Hz |
| Type 3 | E-639 = 159.75 Hz |
| Type 4 | F#-741 = 185.25 Hz |
| Type 5 | A-852 = 213.00 Hz |
| Type 6 | B-963 = 240.00 Hz |
| Type 7 | F-174 = 174.00 Hz |
| Type 8 | D-285 = 142.50 Hz |
| Type 9 | G-396 = 198.00 Hz |

TABLE 14

Illustrative Mapping Between Levels of Consciousness and Frequencies

| | Frequency (Hz) |
|---|---|
| Level 1 | Purple-75-100 |
| Level 2 | Red-100-125 |
| Level 3 | Blue-125-150 |
| Level 4 | Orange 150-175 |
| Level 5 | Green 150-199 |
| Level 6 | Yellow 200-400 |
| Level 7 | Turquoise above 400-540 |

Another approach to modifying a game experience to reflect the level of consciousness for a player's avatar is to modify the activities of the computer controlled characters so that they would act as if they had the same level of consciousness attained by the player's avatar. To illustrate this, consider that, as set forth in table 3, a person at the first level of consciousness desires to keep his or her deity or deities happy and the members of his or her community safe, while a person at the second level of consciousness does what he or she wants regardless of consequences. Accordingly, during an iteration of the process of FIG. 1 where the player's avatar is at a first level of consciousness, statements by computer controlled characters could be adorned with exclamations relating to level one desires (e.g., "I hope the gods will keep us safe from the <disruptive event>;" "It looks like the <disruptive event> might cause <bad consequences> but I believe the gods will protect us;" etc). Once the player had completed the first iteration, and his or her avatar had advanced to the second level of consciousness, the statement made by the computer controlled characters could be adorned with explanations relating to level two desires (e.g., "I'm going to see if I can take something while the storekeeper isn't looking so I can survive the <bad consequence> of the <second disruptive event>;" "It looks like a <second disruptive event> is coming. I'm going to raise my prices so that I can get as much as possible from people preparing for <bad consequence>;" etc).

Non-verbal behaviors could also be affected. For example, computer controlled characters reflecting the second consciousness level could have a high likelihood of being aggressive and engaging in hostile interactions, both with a player's avatar, and with each other. By contrast, computer controlled characters reflecting the first consciousness level could be configured to be much more likely to cooperate with one another. As a concrete illustration of this, in some implementations, computer controlled characters might be configured with different needs (e.g., need for food, need for clothing, etc) and plans for addressing those needs (e.g., going to a store and making a purchase, cultivating or creating the needed item, stealing the needed item from another). Those plans could then be associated with different characteristics reflecting different levels of consciousness (e.g., cooperative, hostile, etc). Then, when a need arises (e.g., as a need for food might arise consistently each morning measured by in-game time), the plan chosen to address that need could vary (which variation could be probabilistic) based on the level of consciousness being demonstrated. Other variations as also possible. Accordingly, the discussion above should be understood as being illustrative only, and not limiting.

In addition to, or as an alternative to, including repeated iterations of the process of FIG. 1 to move through the levels of consciousness shown in table 3, some implementations might also include repeated iterations through the different levels of consciousness. This type of repeated iteration through levels of consciousness could be included, for example, in implementations where a player is presented with multiple avatars, each avatar representing a different personality type. In a preferred embodiment, there would be nine such avatars, representing the nine personality types of the Enneagram, and the player would be required, in order to complete the game, to move through the different levels of consciousness with each of the avatars. This could be supported by extending the basic concepts described above in the context of levels of consciousness to also encompass variations caused by differing personality types. For example, when selecting a course of action, instead of only accounting for the level of consciousness of the player's avatar, the personality type of the player's avatar could be considered as well. However, utilization of multiple personality types of player avatars could be supported in other manners as well. Illustrative examples of how this might take place are set forth below.

One way in which different personality types could be supported in some implementations is to place the player's avatar in a setting which provides further insights into, and reflections of, the avatar's personality type. For example, consider the case of the Enneagram type 2 personality. A person with this personality type will try to present an upbeat, happy and helpful public persona, while suppressing negative emotions that are inconsistent with that public face. To reflect this, a setting with an external geography matching the internal geography of a type 2 personality could be created. Such a setting could include a main area characterized by businesses and locations reflecting an upbeat, happy surface (e.g., shops for luxuries such as jewels, shops for fashions such as tattoos, gathering areas for celebrations, etc). It could also include subsidiary areas kept remote from the main area and characterized by locations reflecting the negative emotions a type 2 personality will try and suppress (e.g., a jail for imprisoning those who don't fit with the positive appearance presented by the main area). Computer controlled characters can also be used to reflect various personality types. For example, just as there might be a jail representing emotions that a type two personality might seek to suppress in a setting reflecting a type two personality, there might be an equivalent character (e.g., a jailer) who illustrates how a type two personality would respond to emotions that are inconsistent with the positive image a type two seeks to portray to the world.

Of course, it should be understood that not all aspects of a computer game will necessarily reflect the personality type or level of consciousness of a player's avatar. For example, settings may have additional types of locations which may not be correlated to specific personality types. These types of locations may include locations which would be used by an avatar to perform acts which, if performed by a player, would contribute to the player's level of consciousness, or which provide messages which could assist a player in understanding himself or herself and others. To illustrate, consider a game in which the process of FIG. 1 includes phases requiring the player to solve puzzles, talk with computer controlled characters, explore the avatar's surroundings, or otherwise interact with the game environment. In such a game, it is possible that the player may reach a point where he or she is unsure what is necessary in order to continue progressing. To address this possibility, the game could be implemented to include a location (e.g., a sacred mountain) the avatar could visit to "meditate" and receive guidance regarding how to make progress, thereby both avoiding (or minimizing) player frustration, and providing rewards for meditating which could motivate the player to meditate in his or her own life. Similarly, it is possible that a game could be implemented so that different avatars are associated with different settings which are physically isolated from one another (e.g., are located on different planets). In such a game, the settings could include portal locations allowing avatars to travel from one setting to another, thereby metaphorically conveying the message to the player that there are connections between all people, even those who appear to be isolated. This type of approach can also be used in generating computer controlled characters which may not be tied to an avatar's personality type. Accordingly, the discussion of how various aspects of a computer game could be used to reflect the personality type of a player's avatar should be understood as being illustrative only, and not limiting.

Based on the disclosure set forth above, one of ordinary skill in the art could implement an interactive computer game which can be used to educate the player regarding how people with various personality types and levels of consciousness would perceive and address disruptive events. However, it should be understood that the technology described herein is not limited to being implemented in the form of a computer game such as described above. For example, rather than presenting information showing how people perceive and address disruptive events depending on their personality type and level of consciousness through an interactive computer game, that information could be presented in a non-interactive form, such as in a video showing a character performing acts which the player avatar would have performed in a video game embodiment as described above.

Other, non-electronic, implementations are also possible. For example the techniques described herein could be used to implement games such as board games. Such games could include components (e.g., cards, figurines, tokens, etc) representing disruptive events, courses of action, player head/heart/body attributes, non-player characters, and items. To play, players could draw cards and then use them to engage in activities such as described above in the computer game implementation (e.g., a player who draws a card representing a particular non-player character could then play that card in order to have his or her avatar engage in an interaction with the non-player character). The interactions could be treated as unconditionally successful (e.g., in an implementation where interactions are used to collect clues, a player could automatically collect a clue each time he or she plays an interaction card), or could be conditioned based on factors such as the player's status (e.g., a player might be restricted to only playing a certain type of interaction if he or he has collected sufficient tokens representing his or her level of consciousness or head/heart/body orientation) and might also be influenced by random elements, such as is traditionally provided by tools such as dice or spinners. Preferably, such a game will have 108 character cards (12 cards for each of the nine Enneagram personality types) and 63 memory cards (cards representing seven levels of consciousness for each of nine Enneagram personality types), as well as tokens, figurines and other cards representing disruptive events, clues, interactions, courses of action, and player equipment. However, other approaches are also possible, and will be immediately apparent to one of ordinary skill in the art in light of the disclosure set forth above.

While above disclosure has set forth information which could be used by one of ordinary skill in the art for purposes such as the creation of computer games, the protection for the inventors' technology accorded by this document or any related document should not be limited to the material explicitly set forth herein. Instead, the protection accorded by this document, or any related document, should be understood as being defined by the claims in such document, when the terms in those claims which are listed under an "Explicit Definitions" heading are given the explicit definitions provided, and the remaining terms are given their broadest reasonable interpretation as shown by a general purpose dictionary. To the extent that the interpretation which would be given to the claims based on this document is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, "cardinality" should be understood to refer to the number of elements in a set.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, the term "data object" should be understood to refer to an identifiable and distinct entity expressed in a form (e.g., data stored in a computer readable medium) which can be manipulated by a computer.

When used in the claims, "database" should be understood be to a collection of data stored on a computer readable medium in a manner such that the data can be retrieved by a computer. The term "database" can also be used to refer to the computer readable medium itself (e.g., a physical object which stores the data).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, a "processor" should be understood to refer to a device, or group of devices, which is capable of performing one or more logical and/or physical operations on data to produce a result.

When used in the claims, "remote" should be understood to refer to the relationship between entities which are physically distant from one another, such as between entities that communicate over a network.

When used in the claims, the term "set" should be understood to refer to a number, group, or combination of zero or more things of similar nature, design, or function.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

Accordingly, We claim:

1. A non-transitory computer readable medium having stored thereon a set of instructions operable to configure a computer to perform a personality type growth demonstration process comprising:
  I. performing an intra-type consciousness raising process comprising:
    a. allowing a user to control a consciousness raising user avatar presented in an interactive computer environment, wherein the consciousness raising user avatar corresponds to an enneagram personality type;
    b. providing the user, via the interactive computer environment, information indicating a disruptive event;
    c. presenting an implementation, by the consciousness raising user avatar in the interactive computer environment, of a course of action responding to the disruptive event, wherein the instructions are operable to configure the computer to constrain the course of action based on the enneagram personality type corresponding to the consciousness raising user avatar and a level of consciousness for the consciousness raising user avatar;

d. determining, after implementation of the course of action responding to the disruptive event and based on physiological information for the user received from a physiological measurement device in electronic communication with the computer, the user's contemplation of deficiencies in the course of action responding to the disruptive event; and e. increasing the level of consciousness for the consciousness raising user avatar based on the user's contemplation of deficiencies in the course of action responding to the disruptive event; and II. repeating the acts of clause I until the level of consciousness for the consciousness raising user avatar is a maximum level of consciousness;

wherein:

a) the physiological measurement device is a galvanic skin response sensor; and b) determining the user's contemplation of deficiencies in the course of action responding to the disruptive event comprises determining if there has been a decrease in the user's skin surface conductivity.

2. The non-transitory computer readable medium of claim 1, wherein the set of instructions is further operable to configure the computer to, for each enneagram personality type, perform the intra-type consciousness raising process with a different user avatar, taken from a plurality of user avatars and identified by data stored on the non-transitory computer readable medium as corresponding to the enneagram personality type irrespective of any user input, as the consciousness raising user avatar.

3. The non-transitory computer readable medium of claim 2, wherein the intra-type consciousness raising process further comprises playing music, the music having a theme determined by a solfeggio frequency corresponding to the enneagram personality type corresponding to the consciousness raising user avatar.

4. The non-transitory computer readable medium of claim 2, wherein the set of instructions stored on the non-transitory computer readable medium is operable to configure the computer to require, as a requirement for completing a computer game, the user to complete the personality type growth demonstration process at least nine times with at least nine different user avatars, wherein:

a. each of the nine different user avatars is taken from the plurality of user avatars; and b. each of the nine different user avatars has a corresponding enneagram personality type which is different from the corresponding enneagram personality types of the other user avatars from the nine different user avatars.

5. The non-transitory computer readable medium of claim 1, wherein:

a. the non-transitory computer readable medium stores data encoding a plurality of levels of consciousness for the consciousness raising user avatar;

b. the plurality of levels of consciousness for the consciousness raising user avatar are organized as a step by step progression from a first level of consciousness to the maximum level of consciousness;

c. the instructions stored on the non-transitory computer readable medium are operable to configure the computer to, on at least one iteration of the intra-type consciousness raising process, provide a plurality of courses of action for responding to the disruptive event, wherein the plurality of courses of action includes a course of action correspond to a level of consciousness lower than the level of consciousness for the consciousness raising user avatar; and d. the instructions stored on the non-transitory computer readable medium are operable to, based on implementation of the course of action corresponding to the level of consciousness lower than the level of consciousness for the consciousness raising user avatar, reduce the level of consciousness for the consciousness raising user avatar.

6. A method comprising performing a personality type growth demonstration process comprising:

I. performing an intra-type consciousness raising process comprising:

a. allowing a user to control a consciousness raising user avatar presented to the user in an interactive computer environment via a display located proximate to the user, wherein the consciousness raising user avatar corresponds to an enneagram personality type and is taken from a plurality of pre-defined consciousness raising user avatars stored in a database;

b. providing the user, via the interactive computer environment, information indicating a disruptive event;

c. presenting an implementation, by the consciousness raising user avatar in the interactive computer environment, of a course of action responding to the disruptive event, wherein the course of action is based on the enneagram personality type corresponding to the consciousness raising user avatar and a level of consciousness for the consciousness raising user avatar;

d. using a processor, determining, after implementation of the course of action responding to the disruptive event and based on physiological information for the user obtained from a physiological measurement device in electronic communication with a computer comprising the processor, the user's contemplation of deficiencies in the course of action responding to the disruptive event; and e. increasing the level of consciousness for the consciousness raising user avatar based on the user's contemplation of deficiencies in the course of action responding to the disruptive event; and II. repeating the acts of clause I until the level of consciousness for the consciousness raising user avatar is a maximum level of consciousness;

wherein:

a) the physiological measurement device is a heart rhythm detector; and b) determining the user's contemplation of deficiencies in the course of action responding to the disruptive event comprises determining if there has been a decrease in the user's heart rate.

7. The method of claim 6, wherein the method further comprises, for each enneagram personality type, allowing the user to perform the intra-type consciousness raising process with a different user avatar, taken from a plurality of user avatars and identified by data stored on a non-transitory computer readable medium as corresponding to the enneagram personality type irrespective of any user input, as the consciousness raising user avatar.

8. The method of claim 7, wherein the intra-type consciousness raising process further comprises playing music, the music having a theme determined by a solfeggio frequency corresponding to the enneagram personality type corresponding to the consciousness raising user avatar.

9. The method of claim 6, wherein:
   a. allowing the user to control the consciousness raising user avatar comprises:
      i. allowing the user to provide commands associated with causing the consciousness raising user avatar to engage in an active behavior; and
      ii. allowing the user to provide commands associated with causing the consciousness raising user avatar to engage in a receptive behavior; and
   b. the act of increasing the level of consciousness for the consciousness raising user avatar from the intra-type consciousness raising process is performed only after the consciousness raising user avatar has engaged in both active and receptive behaviors during the intra-type consciousness raising process.

10. The method of claim 7, wherein:
    a. the computer comprising the processor is configured to determine the user's contemplation of deficiencies in the course of action responding to the disruptive event based on instructions stored on a non-transitory computer readable medium, wherein the instructions stored on the non-transitory computer readable medium also store data indicating a sequence of enneagram personality types; and
    b. the method comprises the user completing the personality type growth demonstration process with each user avatar from the plurality of user avatars as a requirement for completing a computer game.

11. The method of claim 6, wherein:
    a. the intra-type consciousness raising process is performed by the computer comprising the processor based on instructions stored on a non-transitory computer readable medium, wherein the non-transitory computer readable medium stores data encoding a plurality of levels of consciousness for the consciousness raising user avatar;
    b. the plurality of levels of consciousness for the consciousness raising user avatar are organized as a step by step progression from a first level of consciousness to the maximum level of consciousness;
    c. the method comprises, on at least one iteration of the intra-type consciousness raising process, provide a plurality of courses of action for responding to the disruptive event, wherein the plurality of courses of action includes a course of action corresponding to a level of consciousness lower than the level of consciousness for the consciousness raising user avatar; and
    d. the instructions stored on the non-transitory computer readable medium are operable to, based on implementation of the course of action corresponding to the level of consciousness lower than the level of consciousness for the consciousness raising user avatar, reduce the level of consciousness for the consciousness raising user avatar.

12. A machine comprising:
    A. a database;
    B. a computer;
    C. a display; and
    D. a physiological measurement device;
    wherein the computer is configured based on a set of instructions stored on a non-transitory computer readable medium, wherein the set of instructions is operable to configure the computer to perform personality type growth demonstration process comprising:
    I. performing an intra-type consciousness raising process comprising:
       a. allowing a user to control a consciousness raising user avatar presented to the user in an interactive computer environment via the display, wherein the consciousness raising user avatar corresponds to an enneagram personality type and is taken from a plurality of pre-defined consciousness raising user avatars stored in the database;
       b. providing the user, via the interactive computer environment, information indicating a disruptive event;
       c. presenting an implementation, by the consciousness raising user avatar in the interactive computer environment, of a course of action responding to the disruptive event, wherein the course of action is based on the enneagram personality type corresponding to the consciousness raising user avatar and a level of consciousness for the consciousness raising user avatar;
       d. using a processor, determining, based on physiological information for the user obtained from the physiological measurement device, the user's contemplation of deficiencies in the course of action responding to the disruptive event; and
       e. increasing the level of consciousness for the consciousness raising user avatar based on the user's contemplation of deficiencies in the course of action responding to the disruptive event;
       and
    II. repeating the acts of clause I until the level of consciousness for the consciousness raising user avatar is a maximum level of consciousness;
    wherein:
    a) the physiological measurement device is a heart rhythm detector; and
    b) determining the user's contemplation of deficiencies in the course of action responding to the disruptive event comprises determining if there has been a decrease in the user's heart rate.

13. The machine of claim 12, wherein:
    a. allowing the user to control the consciousness raising user avatar comprises:
       i. allowing the user to provide commands associated with causing the consciousness raising user avatar to engage in an active behavior; and
       ii. allowing the user to provide commands associated with causing the consciousness raising user avatar to engage in a receptive behavior; and
    b. the act of increasing the level of consciousness for the consciousness raising user avatar from the intra-type consciousness raising process is performed only after the consciousness raising user avatar has engaged in both active and receptive behaviors during the intra-type consciousness raising process.

14. A non-transitory computer readable medium having stored thereon a set of instructions operable to configure a computer to perform a personality type growth demonstration process comprising:
    I. performing an intra-type consciousness raising process comprising:
       a. allowing a user to control a consciousness raising user avatar presented in an interactive computer environment, wherein the consciousness raising user avatar corresponds to an enneagram personality type;

b. providing the user, via the interactive computer environment, information indicating a disruptive event;

c. presenting an implementation, by the consciousness raising user avatar in the interactive computer environment, of a course of action responding to the disruptive event, wherein the instructions are operable to configure the computer to constrain the course of action based on the enneagram personality type corresponding to the consciousness raising user avatar and a level of consciousness for the consciousness raising user avatar;

d. determining, after implementation of the course of action responding to the disruptive event and based on physiological information for the user received from a physiological measurement device in electronic communication with the computer, the user's contemplation of deficiencies in the course of action responding to the disruptive event; and e. increasing the level of consciousness for the consciousness raising user avatar based on the user's contemplation of deficiencies in the course of action responding to the disruptive event;

and

II. repeating the acts of clause I until the level of consciousness for the consciousness raising user avatar is a maximum level of consciousness;

wherein:
a) the physiological measurement device is a heart rhythm detector; and
b) determining the user's contemplation of deficiencies in the course of action responding to the disruptive event comprises determining if there has been a decrease in the user's heart rate.

15. A method comprising performing a personality type growth demonstration process comprising:

I. performing an intra-type consciousness raising process comprising:

a. allowing a user to control a consciousness raising user avatar presented to the user in an interactive computer environment via a display located proximate to the user, wherein the consciousness raising user avatar corresponds to an enneagram personality type and is taken from a plurality of pre-defined consciousness raising user avatars stored in a database;

b. providing the user, via the interactive computer environment, information indicating a disruptive event;

c. presenting an implementation, by the consciousness raising user avatar in the interactive computer environment, of a course of action responding to the disruptive event, wherein the course of action is based on the enneagram personality type corresponding to the consciousness raising user avatar and a level of consciousness for the consciousness raising user avatar;

d. using a processor, determining, after implementation of the course of action responding to the disruptive event and based on physiological information for the user obtained from a physiological measurement device in electronic communication with a computer comprising the processor, the user's contemplation of deficiencies in the course of action responding to the disruptive event; and e. increasing the level of consciousness for the consciousness raising user avatar based on the user's contemplation of deficiencies in the course of action responding to the disruptive event;

and

II. repeating the acts of clause I until the level of consciousness for the consciousness raising user avatar is a maximum level of consciousness;

wherein:
a) the physiological measurement device is a galvanic skin response sensor; and
b) determining the user's contemplation of deficiencies in the course of action responding to the disruptive event comprises determining if there has been a decrease in the user's skin surface conductivity.

16. A machine comprising:
A. a database;
B. a computer;
C. a display; and
D. a physiological measurement device;

wherein the computer is configured based on a set of instructions stored on a non-transitory computer readable medium, wherein the set of instructions is operable to configure the computer to perform personality type growth demonstration process comprising:

I. performing an intra-type consciousness raising process comprising:

a. allowing a user to control a consciousness raising user avatar presented to the user in an interactive computer environment via the display, wherein the consciousness raising user avatar corresponds to an enneagram personality type and is taken from a plurality of pre-defined consciousness raising user avatars stored in the database;

b. providing the user, via the interactive computer environment, information indicating a disruptive event;

c. presenting an implementation, by the consciousness raising user avatar in the interactive computer environment, of a course of action responding to the disruptive event, wherein the course of action is based on the enneagram personality type corresponding to the consciousness raising user avatar and a level of consciousness for the consciousness raising user avatar;

d. using a processor, determining, based on physiological information for the user obtained from the physiological measurement device, the user's contemplation of deficiencies in the course of action responding to the disruptive event; and e. increasing the level of consciousness for the consciousness raising user avatar based on the user's contemplation of deficiencies in the course of action responding to the disruptive event;

and

II. repeating the acts of clause I until the level of consciousness for the consciousness raising user avatar is a maximum level of consciousness;

wherein:
a) the physiological measurement device is a galvanic skin response sensor; and
b) determining the user's contemplation of deficiencies in the course of action responding to the disruptive event comprises determining if there has been a decrease in the user's skin surface conductivity.

\* \* \* \* \*